United States Patent Office 3,481,330
Patented Dec. 2, 1969

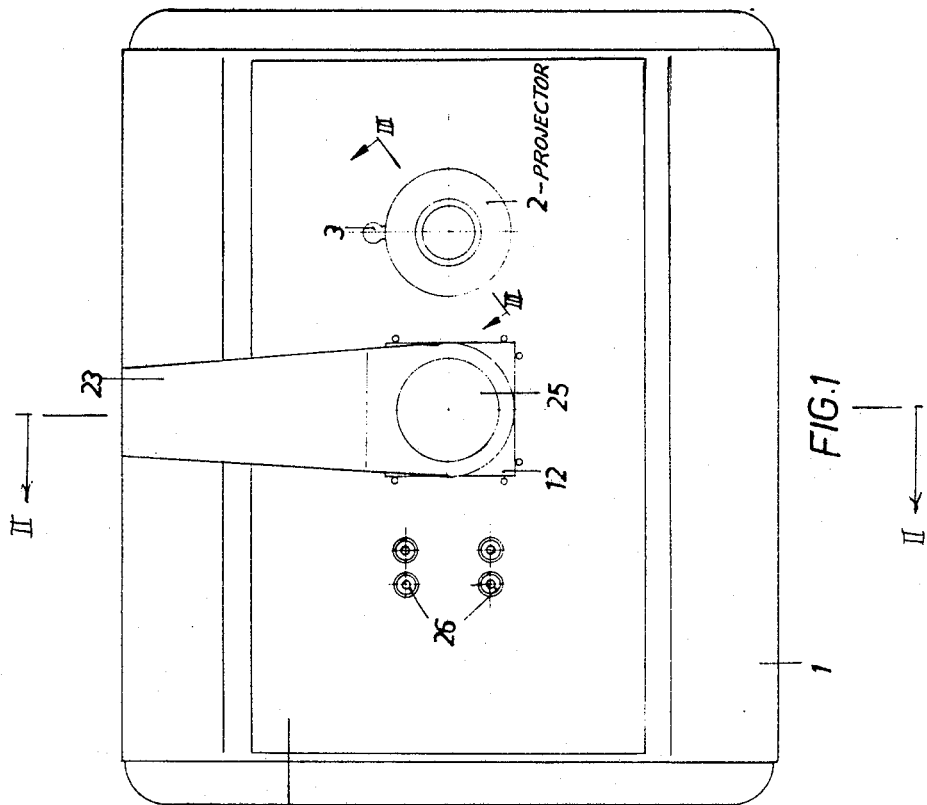
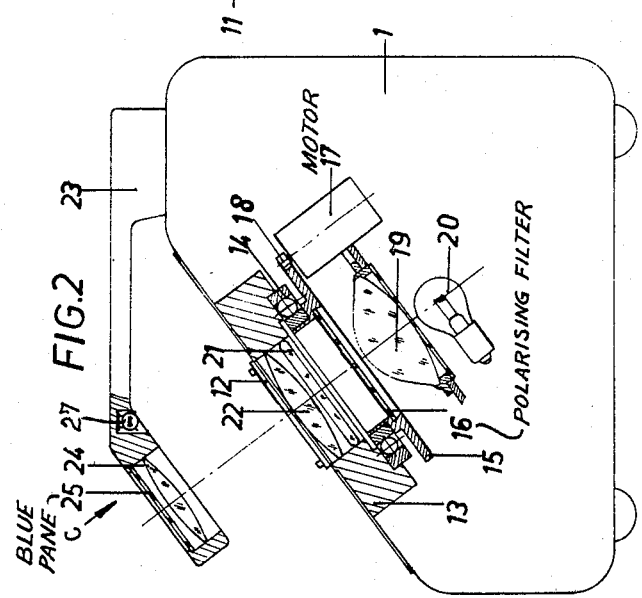
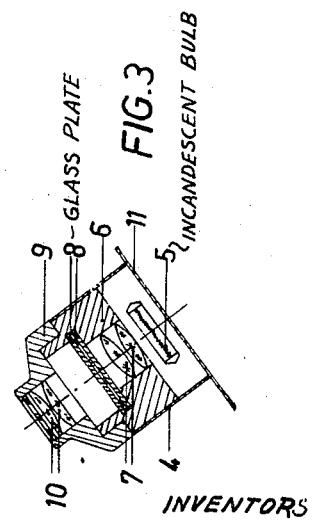
INVENTORS
C. W. Cüppers
K. Kirchhübel
By
Watson, Cole, Grindle & Watson
Attys.

3,481,330
APPARATUS FOR USE IN COORDINATING ECCENTRICALLY FOCUSSING EYES WITH A HEALTHY EYE
Curt W. Cüppers, 63 Giessen, and Kurt Kirchhübel, Dutenhofen, Kreis Wetzlar, both of Germany
Filed Apr. 15, 1965, Ser. No. 448,419
Claims priority, application Germany, Apr. 20, 1964, O 10,092
Int. Cl. A61h 5/00; A61b 3/02
U.S. Cl. 128—76.5          3 Claims

ABSTRACT OF THE DISCLOSURE

A device for use in coordinating an eccentrically focussing eye with a healthy eye in which a frame has a projector mounted thereon to provide an image to be visible to the healthy eye and a transparent drawing panel in the frame visible behind the focussing eye. The device further includes means for generating a Haidinger beam and a blue lens is disposed in front of the panel.

---

The present invention relates to an exercising apparatus for use in coordinating eccentrically focussing or sighting eye with a healthy eye with the fovea. It is known that eccentrically focussing eyes do not focus with the fovea but with an acquired sight centre, whose main direction of sight corresponds to the foveal one of the healthy eye. So-called chiroscopes serve this purpose where a picture is presented by a mirror to the healthy eye which picture is redrawn on a plate with the help of the other eye. The known instruments, however, can only be used if the squinting eye does not yet have any eccentric fixation and any abnormal correspondence. The invention has for its purpose the development of a device in which the redrawing of the image for the healthy eye will become possible with the help of the other eye even if an eccentric fixation of the squinting eye exists.

The main object of the present invention is a device in which this coordination can be effected so that the eccentrically focussing eye focusses with the fovea again.

According to the present invention a device for coordinating the eccentrically focussing or sighting eye comprises a projector offering an image to the healthy eye, and a transparent sighting plate for the other eye, behind which is disposed a device for the generation of a rotating Haidinger beam, and in front of which is disposed a blue lens for observation of the beam and for depicting the sighting plane. The purpose of a device of the invention, is to reproduce an image from the healthy eye only, by using the eccentrically sighting eye for drawing, so that during the depicting of this image it is not sighted with the acquired sight centre but with the fovea.

Behind the transparent sighting or marking plate, the device is mounted for generating the rotating Haidinger beam and in front of the drawing a blue lens is disposed for observation of the beam. A beam of this type has the property that it can be observed only with the fovea, but not from a point external to the fovea. A Haidinger polarisation beam or pencil of rays is observable for a short time, for example, when a blue sky is observed through a polarising filter. If the filter is turned, the beam follows its motion and can be observed continuously. If the patient is simultaneously given the task of drawing the picture seen with the healthy eye only where the Haidinger beam is also visible to him, the picture to be drawn is also sighted with the fovea, and the eccentrically sighting eye is thus again accustomed to sight foveally and is made to coordinate itself with the nerve paths of the healthy eye of the drawing hand.

In order that the invention may be more fully understood an embodiment in accordance therewith will now be described by way of example with reference to the accompanying drawings, in which:

FIG. 1 is a top plan view of the apparatus;
FIG. 2 is a cross section along the line II—II of FIG. 1 looking in the direction of the arrows; and
FIG. 3 is a cross section taken along the line III—III of FIG. 1 in the direction of the arrows.

Referring to the drawings, a projector 2 is disposed on a desk-shaped case 1; the projector 2 into which pictures of different kinds may be inserted is for use by a healthy eye. The pictures are mounted in frames the handle 3 of which is visible in FIG. 1. As shown in FIG. 3, the projector comprises a round housing 4 with an incandescent bulb 5. In an insert 6 are mounted condenser lenses 7 and two glass plates 8 between which the transparent pictures may be inserted. The projector terminates in a head 9. Having a lens system 10 for the projection of pictures disposed between the glass plates 8.

The projector 2 is fixed on a metal plate 11 which has a cutout covered by a transparent drawing plate 12. Under this cutout, a ring 13 is secured in which a ring gear 15 is rotatably mounted in a ball bearing 14. In this ring gear, a polarising filter 16 is mounted. The gear is driven by a motor 17 through a pinion 18, at low speed, for example at one to three revolutions per second. Below the filter is a condenser lens 19 and an incandescent bulb 20 and above the filter 16, in the ring 13, a blue filter 21 and a field lens 22 are provided for intensification of the beam. A field lens 24 and a pane 25 of blue glass are mounted co-axially with the parts 19–21, in an opening in an arm 23. The lens serves for observation of the drawing plane of the pane 12 and the blue pane 25 to render the Haidinger beam visible. The distance of the projector 2 from the drawing panel 12 is adjustable according to the pupillary spacing of the eyes of the patient being examined. The projector and polarising filter may moreover have their positions interchanged. Different switches 26 (FIG. 1), are provided for operating the bulbs as well as for operating auxiliary equipment; a bulb 27 is provided for illuminating the drawing plane as, i.e. the glass pane 12.

I claim:
1. A device for use in coordinating an eccentrically focussing eye with a healthy eye to cause the former to focus foveally, said device comprising a frame, a projector mounted in said frame to provide an image to be visible to the healthy eye, a transparent drawing panel mounted in said frame to be visible by the eccentrically focussing eye, a device disposed behind said panel for generating a Haidinger beam in cooperation with the projected image, and a blue lens disposed in said frame in front of said panel for observation by the eccentrically focussing eye of the beam and for forming the drawing.

2. A device according to claim 1 wherein the projector comprises a housing mounted on the frame and having a light source disposed co-axially, therein, two condenser lenses and a pair of superposed glass plates separated by a space to receive a picture, a head disposed on the housing above said plates, and a lens system in the head to focus the picture projected thereon by the light source.

3. A device according to claim 1 wherein the transparent drawing panel comprises a light source, a condenser lens, a rotatable polarising filter, a rotatable ring, a blue filter, and a field lens, and supported co-axially above and in spaced relation to the drawing panel a second field lens and a blue glass pane, the polarising filter being supported in the rotatable ring driven through gearing by an electric motor.

(References on following page)

References Cited

UNITED STATES PATENTS

| | | | |
|---|---|---|---|
| 2,855,821 | 10/1958 | Cüppers et al. | 351—32 X |
| 3,044,348 | 7/1962 | Cueppers et al. | 351—25 X |
| 2,388,858 | 11/1945 | MacNeille et al. | 128—76 |
| 2,803,246 | 8/1957 | Lange | 128—76 |
| 2,837,087 | 6/1958 | Sawyer | 128—76 |
| 3,277,888 | 10/1966 | Otwell | 128—76 |

RICHARD A. GAUDET, Primary Examiner

J. D. YASKO, Assistant Examiner

U.S. Cl. X.R.

351—26